United States Patent

Schneefeld et al.

[11] Patent Number: 6,160,237
[45] Date of Patent: Dec. 12, 2000

[54] FRICTION WELDING PROCESS FOR MOUNTING BLADES OF A ROTOR FOR A FLOW MACHINE

[75] Inventors: Dieter Schneefeld, Walkertshofen; Hans Wilhelm, Munich; Dietmar Helm, Karlsfeld; Erich Thaler, Dachau, all of Germany

[73] Assignee: MTU Motoren-und Turbinen-Union Muenchen GmbH, Munich, Germany

[21] Appl. No.: 09/256,273

[22] Filed: Feb. 23, 1999

[30] Foreign Application Priority Data

Feb. 23, 1998 [DE] Germany ............................ 198 07 637

[51] Int. Cl.$^7$ .................................................. B23K 20/12
[52] U.S. Cl. .................................... 219/78.02; 219/78.13; 219/601; 219/617; 228/112.1; 228/177; 228/232
[58] Field of Search .................................. 228/112.1, 114, 228/232, 2.1; 219/601, 617, 78.02, 78.13, 91.22, 117.1, 72

[56] References Cited

U.S. PATENT DOCUMENTS

| | | |
|---|---|---|
| 4,119,261 | 10/1978 | Devine, Jr. ............................... 228/113 |
| 4,514,242 | 4/1985 | MacLaughlin et al. ................ 156/73.5 |
| 4,529,115 | 7/1985 | Renshaw et al. ......................... 228/1.1 |
| 4,823,783 | 4/1989 | Willhite, Jr. et al. ...................... 602/52 |
| 4,993,150 | 2/1991 | Reinhardt et al. .................... 29/888.43 |
| 5,240,167 | 8/1993 | Ferte et al. ............................. 228/114.5 |
| 5,829,664 | 11/1998 | Spinella et al. ....................... 228/112.1 |

FOREIGN PATENT DOCUMENTS 695 00 234
T2  8/1995  Germany.

*Primary Examiner*—Samuel M. Heinrich
*Attorney, Agent, or Firm*—Hill & Simpson

[57] ABSTRACT

The invention is directed to a friction welding process for mounting blades of a rotor for a flow machine. A plurality of oblong welding surfaces are provided at a circumferential surface of a carrier and are respectively welded to a welding surface of a blade. The welding temperature is generated by pressing the welding surfaces together and by an oscillating relative motion between the blade and the carrier in the welding plane. At least the blade or the carrier is additionally heated to a temperature lying below the welding temperature in the region of the welding surface.

15 Claims, 1 Drawing Sheet

FRICTION WELDING PROCESS FOR MOUNTING BLADES OF A ROTOR FOR A FLOW MACHINE

FIELD OF THE INVENTION

The present invention is generally directed to a friction-welding process for mounting blades of a rotor for a flow machine. More specifically, the present invention relates to a friction-welding process in which a plurality of oblong welding surfaces are provided at a circumferential surface of a carrier and respectively welded to a welding surface of a blade. A welding temperature is generated by pressing the welding surfaces together and by an oscillating relative motion between the blades and the carrier in a welding plane.

BACKGROUND OF THE INVENTION

Friction welding processes are utilized for mounting blades of carriers such as, for example, disks (blisks) for gas turbines. The carriers generally comprise an at least partially conically fashioned circumferential surface. A plurality of projecting humps uniformly spaced from one another can be provided at the circumferential surface of the carrier. The humps have welding surfaces at their end faces to which a respective blade is welded as an integral component part. The welding surfaces of the carrier and of the blades are pressed together with a compressing force for generating the necessary welding temperature, so that the joint zones or welding planes are heated up to the welding temperature during oscillating/linear relative motion of the blades relative to the carrier. When the welding temperature is reached, compression (axial longitudinal shortening) occurs in the parts to be joined (friction and compression phase).

For achieving good joint qualities, the compression should be distributed between both parts. Depending on the application, compression parts of the same size, or deviating from one another, are desired for the humps of the carrier on the one hand and the blades on the other hand. The compression portions, however, can partly differ greatly due to different thermal strengths of the participating materials and/or different heat elimination conditions as a result of different component part geometries that lead to different temperature profiles in the environment of the welding plane.

In friction welding of what are referred to as blisks for jet engines, titanium (Ti) materials are in fact generally utilized both for the carrier as well as for the blades. However, the two parts can comprise geometries differing from one another, for example, due to a cuboidal fashioned shoulder at the foot of the blade that is required for a clamp mechanism. As a result thereof, different heat illumination conditions and, thus, different temperature profiles in the environment of the welding zone arise that can lead to compression (crushing) parts deviating greatly from one another. When a compression (crushing) part is too low, correspondingly little welding bead is abraded out during the welding process, and contaminants, oxygen-rich inclusions or the like can remain in the welding zone and lead to poorer joint qualities.

In view of the joint quality, a problem is also that highly divergent temperature profiles can occur during the cooling at the end of the friction and compression (crushing) phase of the welding process in the welding zone as a consequence of different volume/surface conditions in the environment of the welding zone. This can lead to unfavorable stresses or edge errors in the joint zone and can reduce the joint quality.

The different volume/surface conditions result from the welding surface that is oblong in cross-section and tapers comparatively acutely in the region of the front and back edges of the blades. As a result, small volumes of material are surrounded by large surfaces in the edge regions compared to the middle region.

European patent document no. 376 874 discloses a method for replacing a running blade of a rotor integrally provided with blades, and also discloses a method for the manufacture thereof. A respective blade is welded to a projecting stub of a rotor disk by pressing the blade against the stub and heating the connecting location to raise the stub and the blade to a temperature that effects softening, metal flow and joining, and that should lie in the range from 1038° C. through 1149° C. An initial heating for improving the joint quality and for avoiding voids in the welding zone is not discussed.

German patent document no. 695 00 234 T2 discloses a method for welding two blade parts, particularly a blade and the connector of a disk that are provided with a thickness at the front and back edge of the blade for improving the weld quality in the production of new parts. Since, given a repair, the connector already has the dimension of the final product, the welding zone is enlarged during repair not with an excess thickness but with a collar such as a lamina. The collar can be placed between the surfaces or proceed around them and is heated during welding to welding temperature and becomes molten, so that its residues must be subsequently removed. One disadvantage is that additional material is required that must be adapted to each of the blade parts. Furthermore, the collar must be adapted to the shape of the welding zone given modification thereof and, since it is not an integral component part, must be attached thereto before the welding.

SUMMARY OF THE INVENTION

One desired, but not necessarily required, object of the invention is creating a method for mounting blades of a rotor for a flow machine of the species initially described wherein the joint quality in the welding zone is improved in an optimally efficient way.

Achieving this object is inventively characterized in that at least the blade or the blade carrier is heated in the region of the respective welding surface to a temperature lying below the welding temperature by an external heat source. This heating can preferably occur before and/or during and/after the friction and compression (crushing) phase.

One advantage of the inventive method is that the joint quality in the welding zone is effectively improved due to the topical, additional heating. Depending on the application, only one of the parts to be joined or both are additionally heated. The method can be utilized both for manufacturing new parts as well as for the repair of rotors provided with blades.

In a preferred embodiment, additional heating is carried out at least in the region of the front blade edge and of the back blade edge. This is because the temperature conditions in the region of the welding zone can be influenced at comparatively critical locations. Also, for example, the cooling in the region of the front blade edge and back blade edge, where comparatively small volumes of material are surrounded by large surfaces compared to the middle region, can be controlled while improving the joint quality.

It is expedient that both the blade as well as the carrier are heated in the welding zone environment. The welding zone environment is preferably heated around the entire circumference of the blade or, respectively of the hump, i.e. in the middle region as well.

After conclusion of the friction and compression (crushing) phase, the temperature is held for between four and six minutes in the cooling phase. The cooling can be efficiently influenced in terms of process technology with an additional heating having this comparatively short duration in such a way that the joint quality is improved in the welding plane and nearly no edge errors such as notches occur in the welding zone.

It can be expedient that the welding surface and the region of the blade adjacent thereto is pre-heated before and, potentially, during the friction and compression (crushing) phase to a temperature lying below the welding temperature. The compression (crushing) part at the blade side can be controlled by this additional (topical) energy, so that it is assured that contaminations or the like are rubbed out with the weld bead resulting from the blade side and the joint quality is improved. This measure proves especially advantageous when the carrier and the blade are manufactured of different materials and the blade material exhibits a higher heat resistance.

It has been shown that an effective influencing of the joint quality can be achieved with a heating to a temperature between 250° C. and 700° C., which definitely lies clearly below the welding temperature. Such a comparatively low temperature has proven adequate in order, for example, to be able to nearly completely prevent edge errors such as, for example, notches that occur in the welding zone as a consequence of stress. This temperature for pre-heating of the welding surfaces at the blade side or carrier side before the welding process has also proven suitable in order to assure an improved joint quality and enable a control of the compression (crushing) parts.

It is expedient that a protective atmosphere which can be utilized for preventing oxidation at exposed parts of the welding surfaces is heated and flows around the welding zone in the region to be heated, for example, in the region of the leading blade edge and trailing blade edge or, alternatively, around the entire circumference of the blade.

Depending on the application, it can be advantageous that a fluid (liquid) medium is heated and flows around the region to be heated.

It can be expedient to implement the heating inductively. Such a heating is suitable, for example for the pre-heating of the welding surface of the blade and, potentially of that region of the blade adjacent thereto, which can preferably ensue in the range of minutes. The inductive heating can also be utilized for the pre-heating of the welding surface of the carrier or the post-heating that ensues after the termination of the friction and compression (crushing) phase.

Alternatively, the heat provided by an additional heat source can also ensue by heating with radiation or resistance heating.

The welding surfaces at the carrier side are preferably fashioned at the end face at a hump projecting beyond the circumferential surface of the carrier, and the hump is additionally heated to a temperature lying below the welding temperature.

DETAILED DESCRIPTION OF THE PRESENTLY PREFERRED EMBODIMENTS

Although the present invention can be made in many different forms, the presently preferred embodiments are described in this disclosure and shown in the attached drawings. This disclosure exemplifies the principles of the present invention and does not limit the broad aspects of the invention only to the illustrated embodiments.

Figure 1:
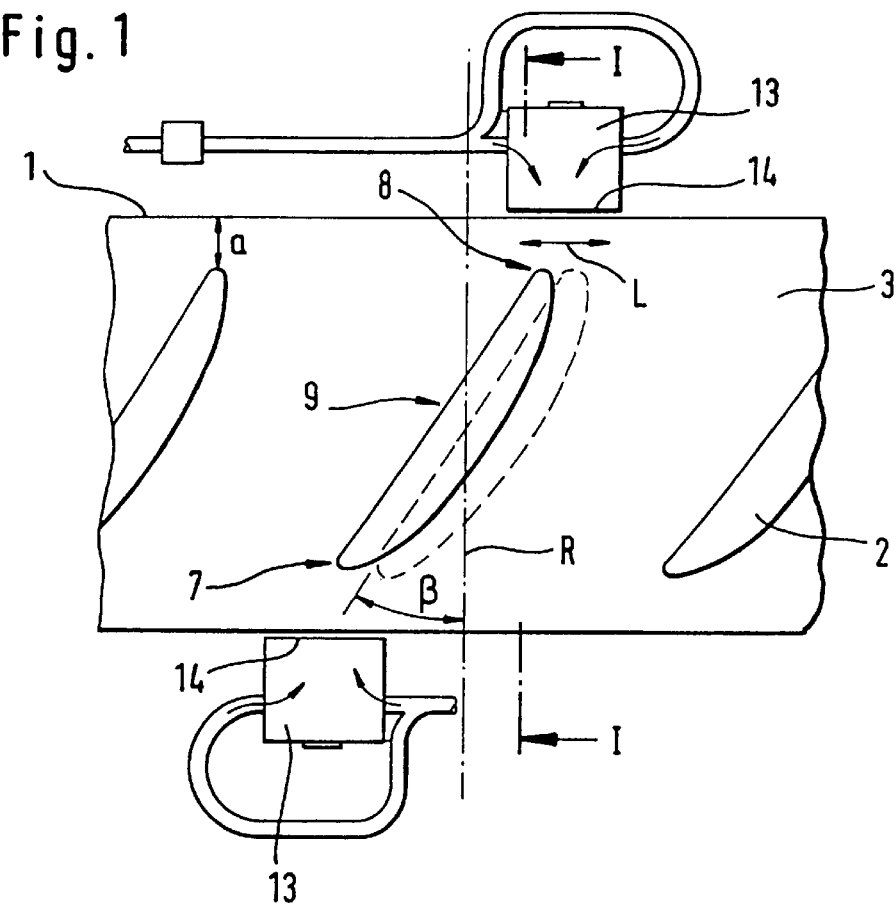
FIG. 1 is a partial view of a carrier disk mounted with blades for a flow machine and having protective atmosphere showers.
Figure 2:
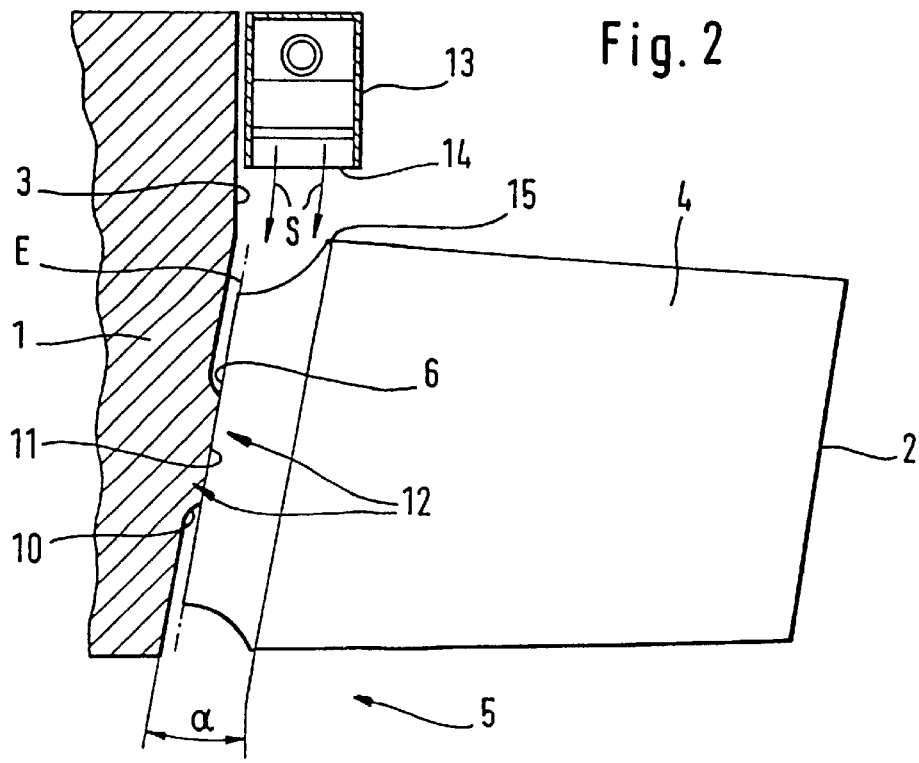
FIG. 2 is a view of the carrier disk mounted with blades according to the section I—I of FIG. 1.

FIG. 1 and FIG. 2 show the running wheel of a jet engine as an example of a carrier mounted with blades for a flow machine. The running wheel is composed of a carrier 1 fashioned as disk (blisk) at whose circumferential surface 3 a plurality of identical blades 2 are attached. The carrier 1 and the blades 2 are fabricated of a titanium (Ti) alloy and form an integral component part. Alternatively, the inventive method can also be applied when the carrier 1 and the blade 2 are composed of different materials.

In the manufacture of new parts, the blades 2, or the blades 2 provided with over-measure material in the region of the welding surface, are first frictionwelded to the carrier 1. Subsequently, a final processing (material-removing) is implemented at the welding zone region. The material is removed from the welding zone in order to remove the welding bead and in order to provide the blades 2 as well as humps 10 projecting beyond the circumferential surface 3 of the carrier 1 their ultimate form taking aerodynamic and strength aspects into consideration. During repair, a blade to be replaced is first detached and the welding process is then correspondingly implemented.

As can also be seen in FIG. 2, wherein the blade 2 is projected into the plane of section, a standard blade 2 is composed of a blade pan 4 and a blade footing 5 that merges into a planar welding surface 6 in the unmachined condition. Depending on the application, the welding surface 6 could also be fashioned curved. The blade pan 4 exhibits a curved shape in cross-section and is fashioned relatively long and thin in radial direction. It can be seen in FIG. 1 that the blade pan 4 converges comparatively narrowly in the region of the leading blade edge 7 and the trailing blade edge 8, and the blade pan 4 is clearly narrower in the regions of the leading and trailing blade edges 7, 8 than in the middle region 9.

In the blade pan 4, the welding surface 6 comprises a contour similar to the blade profile and is spaced from a lower end section 15 of the blade footing 5 by a few millimeters (for example 2 through 8 mm) by a pedestal comprising radii. The end section 15 of the blade footing 5 can, for example, be grasped with a friction lock in order to apply the compression (crushing) forces onto the blade 2 or, respectively, the welding surface 6 thereof during the friction welding, as in the oscillating, linear relative motion.

The carrier 1 is fashioned essentially dynamically balanced and has a rotational axis R coinciding with the rotational axis of the engine. Perpendicular to the rotational axis R, the carrier 1 comprises two essentially planar end faces proceeding parallel to one another between which the circumferential surface 3 of the carrier 1 extends. A plurality of slightly projecting humps 10 are fashioned on the circumferential surface 3, and are aligned at a blade angle β relative to the rotational axis R. Each hump 10 comprises a planar welding surface 11 whose contour essentially corresponds to the welding surface 6 of the blade 2 and has a size can be smaller than the size of the welding surface 6. Alternatively, the welding surface 11 could likewise be fashioned curved corresponding to a welding surface 6 fashioned curved. In practice, the carrier 1 usually has a circumferential surface 3 with an essentially conical sectionshaped design. As can be seen in FIG. 2, the welding surfaces 11 are provided in the conical-shaped portion of the circumferential surface 3, and the blades 2 are attached after the friction welding. A cylindrical portion of the circumferential surface 3 of the carrier 1 adjoins the conical portion at an angle a. The inventive method can also be applied given arbitrarily differently designed carriers 1.

For the friction welding process, the carrier 1 is secured in a position such that the welding surface 11 to which a blade 2 is welded lies in a plane E that proceeds parallel to a direction L of the linear oscillation motion. The welding surface 11 to be provided with a blade is then located in what is referred to as welding attitude. In friction welding of the blade 2 to the carrier 1, the welding surface 6 of the blade 2 is brought into contact with the appertaining welding surface 11 of the hump 10 of the carrier 1. In order to generate the required welding temperature, a compressive (crushing) force is applied onto the blade 2 perpendicular to the welding surfaces 6, 11 and also onto the welding zone in the plane E, and the blade 2 is simultaneously moved rapidly back and forth relative to the carrier 1 in order to generate frictional heat. The required welding temperature generally amounts to at least 1,000° C. As soon as adequate heat has been generated, the oscillating relative motion is de-activated and the compressive (crushing) force is maintained until the blade 2 is welded to the carrier 1 and integrally connected thereto. Dependent upon the application, the compressive (crushing) force could also be alternatively increased or lowered. Subsequently, the carrier 1 is released and turned into a position in which the next blade 2 can be welded onto the carrier 1. This sequence is repeated until all blades 2 are welded to the carrier 1.

In a development of the inventive method, a welding zone environment 12 adjacent to the welding plane E above and below in radial direction is heated to a temperature lying below the welding temperature in the cooling phase that follows the friction and compression (crushing) phase. At this temperature, which preferably lies between 250° C. and 700° C., a softening or a flow of metal that effects the welding occurs given the materials employed for the carrier 1 and the blade 2. However, the temperature affects the cooling behavior and, in particular, the temperature profile can be controlled after the welding process resulting in that the occurrence of voids is effectively reduced or, respectively, largely prevented, particularly in the edge region of the welding zone, so that a clear improvement of the weld quality can be achieved.

In the present embodiment of the method, the heating ensues with a heated protective atmosphere S medium. The welding zone environment 12 is heated to 300° C. by the heated protective atmosphere and the region to be heated is charged therewith for five minutes following the end of the friction and compression (crushing) phase. Depending on the application, the medium could also alternatively be a fluid (liquid). A protective atmosphere shower 13 is respectively arranged at the carrier 1 in the region of the leading blade edge 7 and the trailing blade edge 8 and delivers the protective atmosphere S. The protective atmosphere showers 13 each comprise a circular arc-shaped, curved gas exit opening 14 that extends at the circumferential surface 3 over an arc length covering the leading blade edge 7 or, respectively, the trailing blade edge 8. The gas exit openings 14 are spaced in the direction of the rotational axis R from the respective blade edges 7, 8, whereby this spacing (shown in FIG. 1) is to be selected such that the welding zone environment 12 to be heated is reliably swept by the heated protective atmosphere S. It has been shown that the weld quality is improved when the welding surface 6 of the blade 2 is pre-heated for approximately one minute before the welding process.

Alternatively, the protective atmosphere shower 13 could also extend over a larger arc length at the circumferential surface 3 of the carrier in order to thus heat the welding zone environment 12 not only at the particularly critical blade edges 7, 8 but along the entire circumference thereof during the cooling phase. Further, a protective gas shower 13 could also be arranged only at one side of the carrier 1, whereby the flooding of the welding zone environment 12 could be guaranteed by a sleeve of foil or the like surrounding this region. The arrangement of the gas exit opening 14 of the protective gas showers 13 is to be selected such that in radial direction the welding plane E or the welding zone environment 12 is completely covered by the flow of the heated protective atmosphere S.

The heating of the welding zone environment 12 for assuring a controlled cooling could also ensue by some other, additional heat sources. The heating, however, is not based on rubbing the welding surfaces 6, 11 against one another. For example, an inductive heating, a resistance heating or a heating by radiation come into consideration as other additional heat sources.

In a further development of the inventive method, the welding surface 6 of the blade 2 is heated to a temperature of approximately 500° C. before the friction and compression (crushing) phase. This additional application of energy can also be continued during the welding process. The pre-heating proves advantageous especially given rotors composed of different materials. Given condenser as well as turbine blisks, the carrier 1, and the blades 2 can be composed, for example, of different alloys on a nickel base. When the carrier 1 is composed, for example, of a forged alloy and the blade 2 is composed of a cast alloy, extremely different heat resistance are present. Without the additional heating of the welding surface 6 of the blade 2, which affects the temperature in the blade 2 and, among other things, controls the size of the crushing component, extremely low crushing components thereby occur at the blade side. There is definitely the risk that contaminants or weld constituents will not be abraded out and the weld quality is reduced, for example, by voids in the welding zone.

While the presently preferred embodiments have been illustrated and described, numerous changes and modifications can be made without significantly departing from the spirit and scope of this invention. Therefore, the inventors intend that such changes and modifications are covered by the appended claims.

The invention is claimed as:

1. A friction welding process for mounting blades of a rotor to a carrier for a flow machine, comprising the steps of:
   providing a plurality of oblong welding surfaces at a circumferential surface of a carrier that are each respectively welded to a welding surface of a blade in which the welding surfaces of the carrier and blade are made of the same material;
   generating a welding temperature by pressing the welding surfaces of the carrier and blade together and by an oscillating relative motion between the blade and the carrier in a welding plane; and
   additionally heating at least one of the blade and the carrier in an area of a leading blade edge and a trailing blade edge to a temperature lying below the welding temperature in the region of the respective welding surface.

2. A friction welding process according to claim 1, wherein the additional heating occurs before and/or during and/or after the generating a welding temperature step which is a friction and compression phase.

3. A friction welding process for mounting blades of a rotor to a carrier for a flow machine, comprising the steps of:
provinding a carrier having a plurality of raised welding surfaces extending outward from a circumferential surface;
providing a plurality of blades, each blade having a raised welding surface extending outward from a blade footing and to be welded to one carrier welding surface;
generating a welding temperature by pressing the welding surfaces of the carrier and the blade together and by oscillating relative motion between the blade and carrier in a welding plane; and
additionally heating at least one of the blade and the carrier in an area of a leading blade edge and a trailing blade edge to a temperature lying below the welding temperature in the region of the respective welding surface.

4. A friction welding process according to claim 1, wherein the blade and the carrier are heated by the additional heating in a welding zone environment.

5. A friction welding process according to claim 4, wherein the welding zone environment is heated by the additional heating over its entire circumference.

6. A friction welding process according to claim 1, wherein the temperature from the additional heating is maintained between four and six minutes in a cooling phase following the end of a friction and compression phase.

7. A friction welding process according to claim 1, wherein the welding surface of the blade and a region of the blade adjacent thereto is pre-heated to a temperature lying below the welding temperature before a friction and compression phase.

8. A friction welding process according to claim 1, wherein the additional heating is to a temperature about between 250° C. and 700° C.

9. A friction welding process according to claim 1, wherein the additional heating is provided with an additional, external heat source.

10. A friction welding process according to claims 1, 2, and 4–9, wherein a protective atmosphere is heated up and floods the region to be heated.

11. A friction welding process according to claims 1, 2, and 4–9, wherein a fluid medium is heated up and floods the region to be heated up and floods the region to be heated.

12. A friction welding process according to claims 1, 2, and 4–9, wherein the additional heating is caused by inductive heating.

13. A friction welding process according to claims 1, 2, and 4–9, wherein the additional heating is caused by heating with radiation.

14. A friction welding process according to claims 1, 2, and 4–9, wherein the additional heating is caused by heating with resistance heating.

15. A friction welding process according to claims 1, 2, and 4–9, wherein the welding surfaces of the carrier are each fashioned at a hump projecting from the circumferential surface of the carrier, and the hump is heated by the additional heating to a temperature lying below the welding temperature.

* * * * *